United States Patent
Hayes et al.

(10) Patent No.: US 9,582,158 B2
(45) Date of Patent: Feb. 28, 2017

(54) EFFICIENT USAGE OF SCREEN REAL ESTATE ON AN ELECTRONIC DEVICE

(71) Applicant: International Business Machines Corporation, Armonk, NY (US)

(72) Inventors: Kyle E. Hayes, Berks (GB); Christopher Monahan, Hursley (GB); Thomas L. Roach, Winchester (GB); Domanic N. Smith-Jones, Birmingham (GB); Joseph R. Winchester, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 299 days.

(21) Appl. No.: 13/959,690

(22) Filed: Aug. 5, 2013

(65) Prior Publication Data

US 2014/0040799 A1 Feb. 6, 2014

(51) Int. Cl.
*G06F 3/14* (2006.01)
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC ..................................... G06F 3/14; G06F 3/17
USPC ................. 715/765; 345/173, 419, 1.3, 677; 348/207.1; 725/109
See application file for complete search history.

(56) References Cited

U.S. PATENT DOCUMENTS

| | | | |
|---|---|---|---|
| 5,666,498 A | 9/1997 | Amro | |
| 5,859,639 A | 1/1999 | Ebrahim | |
| 7,159,189 B2 | 1/2007 | Weingart et al. | |
| 7,480,872 B1 | 1/2009 | Ubillos | |
| 7,890,882 B1 | 2/2011 | Nelson | |
| 8,810,660 B2 * | 8/2014 | Tomat et al. | 348/207.1 |
| 2003/0128205 A1 * | 7/2003 | Varghese | 345/419 |
| 2005/0125742 A1 | 6/2005 | Grotjohn et al. | |
| 2005/0160468 A1 * | 7/2005 | Rodriguez | G06F 3/14 725/109 |
| 2005/0162445 A1 | 7/2005 | Sheasby et al. | |
| 2005/0270311 A1 * | 12/2005 | Rasmussen | G01C 21/32 345/677 |
| 2007/0157160 A1 | 7/2007 | Arend et al. | |
| 2007/0288863 A1 | 12/2007 | Ording et al. | |

(Continued)

*Primary Examiner* — Ruay Ho
(74) *Attorney, Agent, or Firm* — Convergent Law Group LLP

(57) ABSTRACT

Exemplary embodiments provide a computer implemented method and computer program product for efficient usage of screen real estate, and an electronic device configured to execute the computer program product, by controlling the display of GUI objects on a display screen of an electronic device. This controlled display further comprises identifying a user-selected part of an original GUI object that is associated with an application program, in response to detection of a predefined user interaction with the original GUI object. A new representative GUI object is then created and displayed on screen, and this new object comprises a visual representation of the selected part of the first GUI object. This second GUI object automatically replaces the first GUI object on the display screen. Subsequent user interactions with the second GUI object are mapped to instructions to the application program.

14 Claims, 6 Drawing Sheets

(56) References Cited

U.S. PATENT DOCUMENTS

2010/0060547 A1* 3/2010 Bloebaum ............. G06F 1/1624
                                                    345/1.3
2011/0141043 A1* 6/2011 Soubrie ........................ 345/173

* cited by examiner

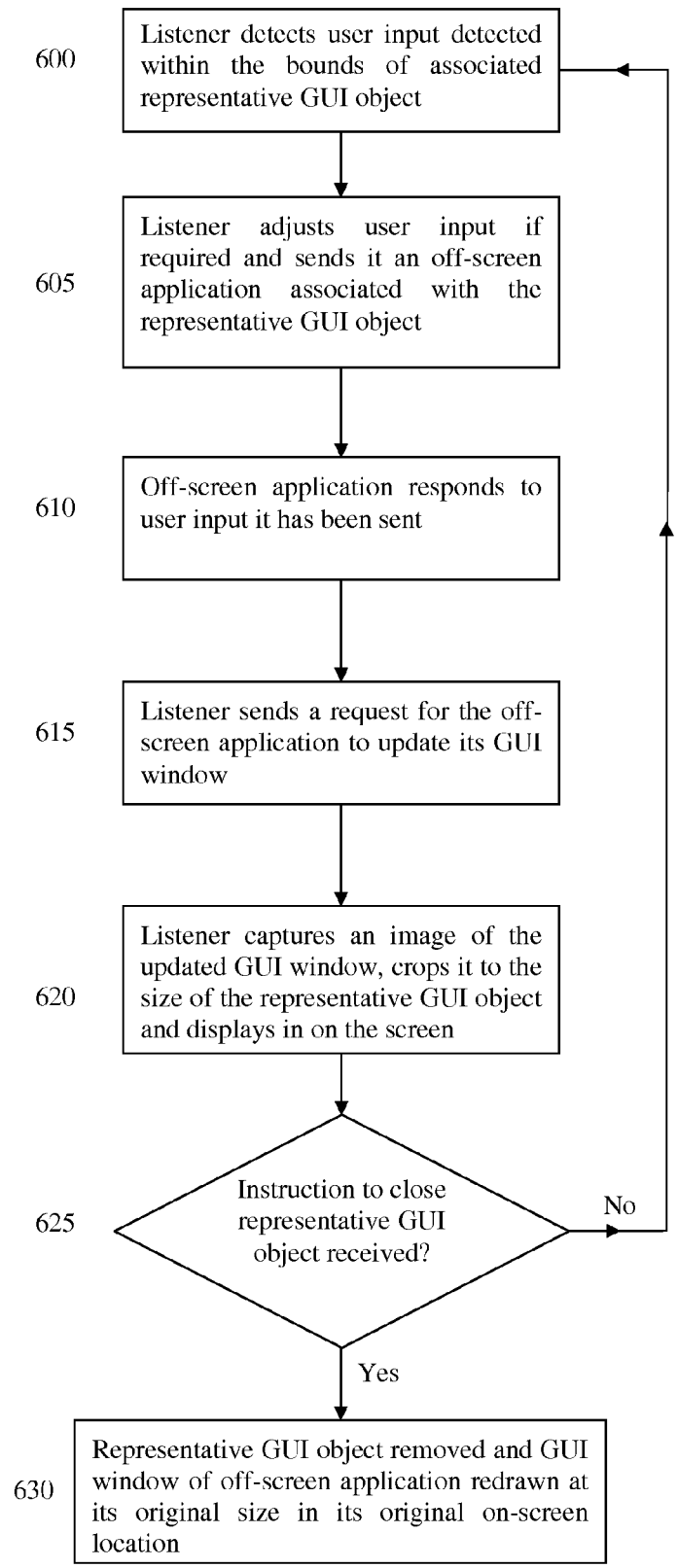

EFFICIENT USAGE OF SCREEN REAL ESTATE ON AN ELECTRONIC DEVICE

CROSS-REFERENCE TO RELATED APPLICATIONS

This application claims the benefit under 35 U.S.C. 119 of Patent Application No. GB1213944.0, filed Aug. 6, 2012, assigned to the assignee of the present application, and incorporated herein by reference.

FIELD OF THE INVENTION

The exemplary embodiment relates generally to a computer implemented method for efficient usage of screen real estate, and a computer program product and an electronic device configured to carry out such a method. More particularly, the exemplary embodiment relates to a solution for displaying the contents of only a desired part of an application's content on a screen.

BACKGROUND

In recent times the number of software applications that are readily available to a user of an electronic device has vastly increased. High speed internet connections allow users to download and install new applications in a matter of seconds, leading to the typical user having many applications installed on a single electronic device. Here the term electronic device may include personal and laptop computers, tablet computers, notebook computers, mobile telephones, PDA's, e-book readers and the like.

Furthermore, the steady improvement of inter alia processing power and memory capacity on such electronic devices has led to these devices being able to run many applications simultaneously without encountering significant performance issues. Thus, users of such devices regularly have many applications running in parallel.

Each application typically presents the user with a user interface, often in the form of a graphical user interface (GUI), to allow the user to interact with the application. The GUI is displayed on the screen of the device and the user may interact with it via one or more input devices, such as a mouse, keyboard or touchpad. In some cases the screen itself doubles as an input device, with such a screen being known as a touchscreen.

Often a GUI for a given application will include one or more GUI windows that are displayed to the user on the screen of the electronic device. These GUI windows display information or 'content' to the user, such as the text and images of a typical web page in the case of an internet browser or a text document in the case of a word processing application. A GUI window may also include one or more controls that allow the user to control and interact with the application that the GUI window belongs to. Examples of controls include buttons, menus, text entry fields, checkboxes, radio buttons and lists.

In the case where many applications having at least one GUI window are running on an electronic device, it readily becomes apparent that these GUI windows have competing requirements for allocation of screen real estate on the screen of the device. Typically, each application will benefit from having as much screen real estate allocated to it as possible.

Various methods of arranging GUI windows on an electronic device to facilitate screen real estate sharing are known. These known methods are based around positioning and/or resizing one or more GUI windows such that a number of GUI windows can be positioned on the screen of the electronic device in a way that shares screen real estate between them.

One way in which screen real estate may be shared between running applications is to 'tile' the GUI windows, such that each GUI window is allotted a portion of the screen within which to display its content to the user. In this approach GUI windows typically border one another, but do not overlap. This type of arrangement allows the user to view many GUI windows simultaneously but often forces a GUI window to shrink to a size at which the content it is displaying is cropped and/or difficult for the user to read and interact with effectively.

Typically the position and size of each GUI window in a tiling system is automatically chosen by the electronic device itself, which may result in a GUI window arrangement that is counterintuitive or that does not suit the current needs of the user. The user may then be required to manually alter the tiling arrangement to better suit their needs, requiring additional time and effort on their part.

Another way in which screen real estate may be shared between running applications is to 'stack' their GUI windows. In this approach GUI windows are allowed to overlap and thus at least partially obscure one another, with the user having the ability to move and/or resize each GUI window relative to the others and taking account of the physical extents of the screen, according to their current viewing preference. In the extreme case the user may choose to 'maximise' one GUI window such that it occupies substantially all of the screen of the electronic device, at the expense of being able to view and interact with all of the other GUI windows. The user may also choose to 'minimize' a GUI window, such that it is not displayed anywhere on the screen, in order to gain screen real estate for allocation to another GUI window.

In order to make effective use of either the 'stacking' or 'tiling' approach the user is required to invest time and thought into arranging their current GUI windows. Typically GUI windows are rearranged via input from a human input device, which may be slow due to the number of steps involved. For example, the user may need to manually resize a GUI window via a series of mouse clicks, reposition the GUI window relative to the physical extents of the display device via a mouse 'click and drag' operation, and then scroll around in the GUI window to ensure the content they wish to view is displayed as fully as possible.

In many cases, when a GUI window of an application is resized the application redraws the content in the GUI window based on assumptions about how best to display its content in the newly sized GUI window. This may involve clipping the content, so that the user must scroll around inside the GUI window to view different portions of the total content, or resizing the content, which may decrease its readability or cause the user to have to be inordinately precise with a human input device in order to interact correctly with the application.

Thus, known GUI window arrangement methods suffer the drawback of a relatively complex sequence of steps being required for the user to view and interact with the content of each GUI window, as well as making the content less readable to the user and making the application more difficult to control and interact with.

Of course, the amount of available screen real estate may be increased by providing one or more additional displays for the electronic device to use. However, in many cases this is undesirable or even unfeasible due to the increased cost and complexity associated with providing additional displays, as well as the reduction in portability that this causes.

Therefore, there is a need in the art to address the aforementioned problem.

BRIEF SUMMARY OF THE INVENTION

A first aspect of the exemplary embodiment provides a method of controlling the display of GUI objects on a display screen of an electronic device in response to user interactions, while the electronic device is executing one or more application programs including a first application program having a first GUI object associated therewith, the method comprising: identifying a selected part of the first GUI object, in response to detection of a first predefined user interaction with the first GUI object; creating a second GUI object comprising a visual representation of the selected part of the first GUI object, and displaying the second GUI object on the display screen so as to automatically replace the first GUI object on the display screen; and mapping detected user interactions with the second GUI object to instructions to the first application program, such that said user interactions with the second GUI object control the first application program.

Using the exemplary embodiment, a user is able to easily and quickly specify a particular part of a GUI object (e.g. a window) that they want to be able to view and interact with, and a visual representation of this part automatically replaces the first GUI object. The part of the GUI object chosen by the user is easy for the user to select, view and interact with. In one embodiment, this specified part can be resized in a manner that is intuitive for the user.

In one embodiment, displaying the second GUI object to automatically replace the first GUI object involves assigning the first GUI object to a coordinate space that is outside the display screen's display area when displaying the second GUI object. In one embodiment, mapping detected user interactions comprises detecting user interactions (of one or more predefined types of interaction) with the second GUI object and mapping each detected user interaction of one or more predefined types to a location within the first GUI object's coordinate space that is outside the display screen's display area, so that the detected user interaction is interpreted as an interaction with the first GUI object.

A second aspect of the exemplary embodiment provides a computer program product for controlling the display of GUI objects on a display screen of an electronic device in response to user interactions, while the electronic device is executing one or more application programs including a first application program having a first GUI object associated therewith, the computer program product comprising a computer-readable storage medium having computer-readable program code embodied thereon, the computer-readable program code configured to: identify a selected part of the first GUI object, in response to detection of a first predefined user interaction with the first GUI object; create a second GUI object comprising a visual representation of the selected part of the first GUI object, and display the second GUI object on the display screen so as to automatically replace the first GUI object on the display screen; and map detected user interactions with the second GUI object to instructions to the first application program, such that said user interactions with the second GUI object control the first application program.

A third aspect of the exemplary embodiment provides an electronic device having a display screen on which GUI objects are displayed, the electronic device operating in response to user interactions while the electronic device is executing one or more application programs including a first application program having a first GUI object associated therewith, the electronic device configured to: identify a selected part of the first GUI object, in response to detection of a first predefined user interaction with the first GUI object; create a second GUI object comprising a visual representation of the selected part of the first GUI object, and display the second GUI object on the display screen so as to automatically replace the first GUI object on the display screen; and map detected user interactions with the second GUI object to instructions to the first application program, such that said user interactions with the second GUI object control the first application program.

Viewed from a further aspect, the exemplary embodiment provides a computer program product for controlling the display of GUI objects on a display screen of an electronic device in response to user interactions, while the electronic device is executing one or more application programs including a first application program having a first GUI object associated therewith, the computer program product comprising: a computer readable storage medium readable by a processing circuit and storing instructions for execution by the processing circuit for performing a method for performing the steps of the invention.

Viewed from a further aspect, the exemplary embodiment provides a computer program stored on a computer readable medium and loadable into the internal memory of a digital computer, comprising software code portions, when said program is run on a computer, for performing the steps of the invention.

BRIEF DESCRIPTION OF THE DRAWINGS

Preferred embodiments of the exemplary embodiment will now be described, by way of example only, with reference to the following drawings in which:

FIG. 6 shows a process by which a user may interact with a user control located in a representative GUI object created via the process of FIG. 3.

DETAILED DESCRIPTION OF THE EMBODIMENTS

Figure 1:
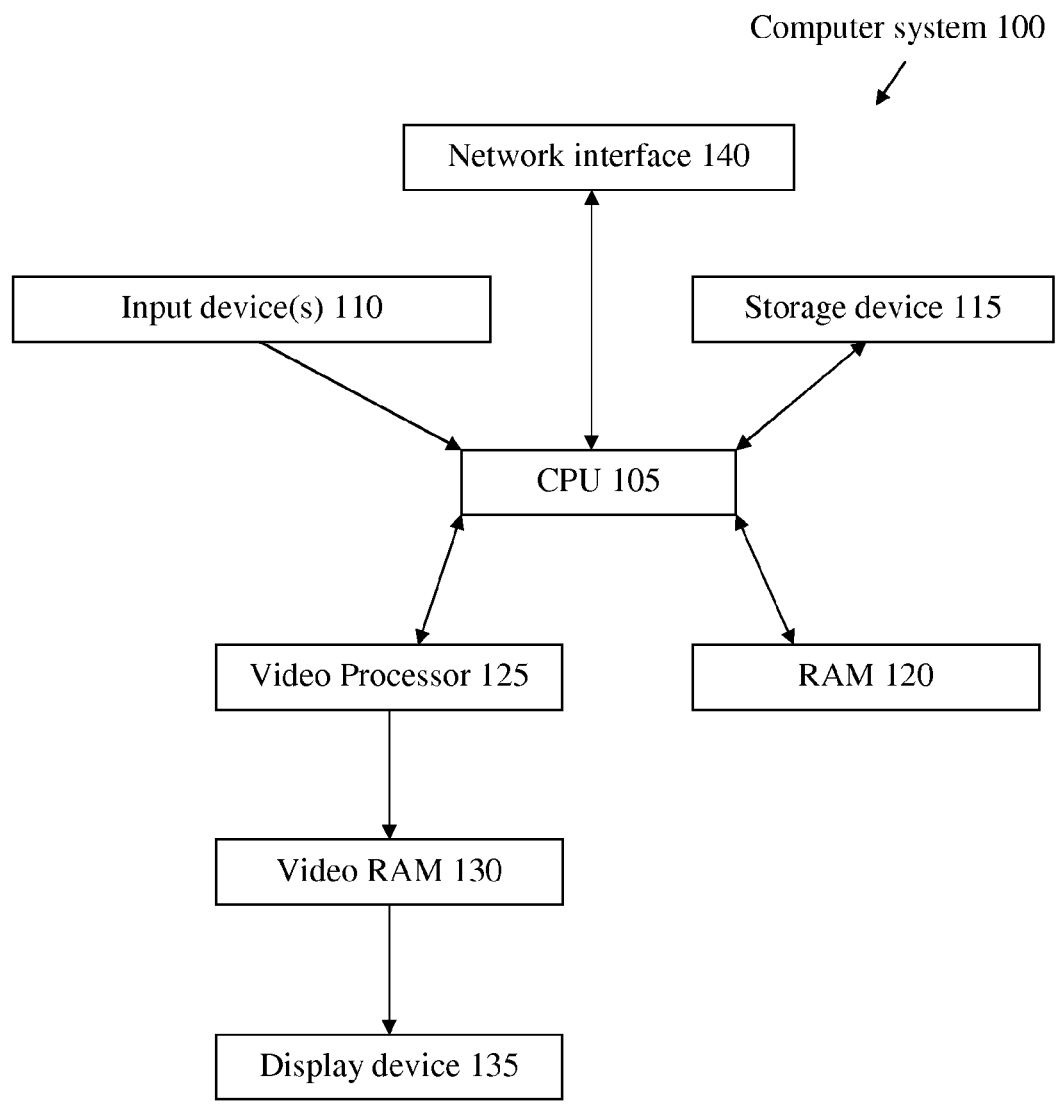
FIG. 1 is a schematic diagram of an exemplary electronic device suitable for use with embodiments described herein.

FIG. 1 is a schematic diagram of an exemplary electronic device which may be used to display GUI windows.

In FIG. 1 the electronic device is a computer system 100, but it will be appreciated that embodiments described herein are not limited to any particular type of data processing device. In particular, embodiments described herein are also suited for use on any other data processing device having a screen, including but not limited to desktop computers, tablet computers, laptop computers, notebook computers, tablet computers, PDA's, mobile telephones, e-book readers and the like.

Computer system 100 includes a central processing unit (CPU) 105 that co-ordinates the operation of computer system 100 and the application(s) that it is executing. CPU 105 is operatively coupled to one or more input devices 110, which may be a mouse, keyboard, touchpad, touchscreen or the like. CPU 105 may also be operatively coupled to a long term storage device 110, which may be a hard disk drive (HDD), solid-state drive (SSD), memory card or other such long term electronic storage means. Random Access Memory (RAM) 120 is operatively coupled to CPU 105 and provides a temporary storage space and working area for computer system 100.

Also operatively coupled to CPU 105 is a video processor 125 having associated video RAM 130. Video processor 125 receives and processes instructions from CPU 105 to cause display device 135 to display a graphical representation of the current operative state of computer system 100 to a user via at least one display device 135. Video processor 125, video RAM 130 and display device 135 may be of any type known in the art of computing. The graphical representation displayed on the screen of display device 135 may include one or more GUI windows associated with and/or controlled by one or more applications that are executing or running on computer system 100.

Computer system 100 may also include a network interface 140 to allow computer system 100 to communicate with other electronic devices via a network such as a packet switched network.

Figure 2:
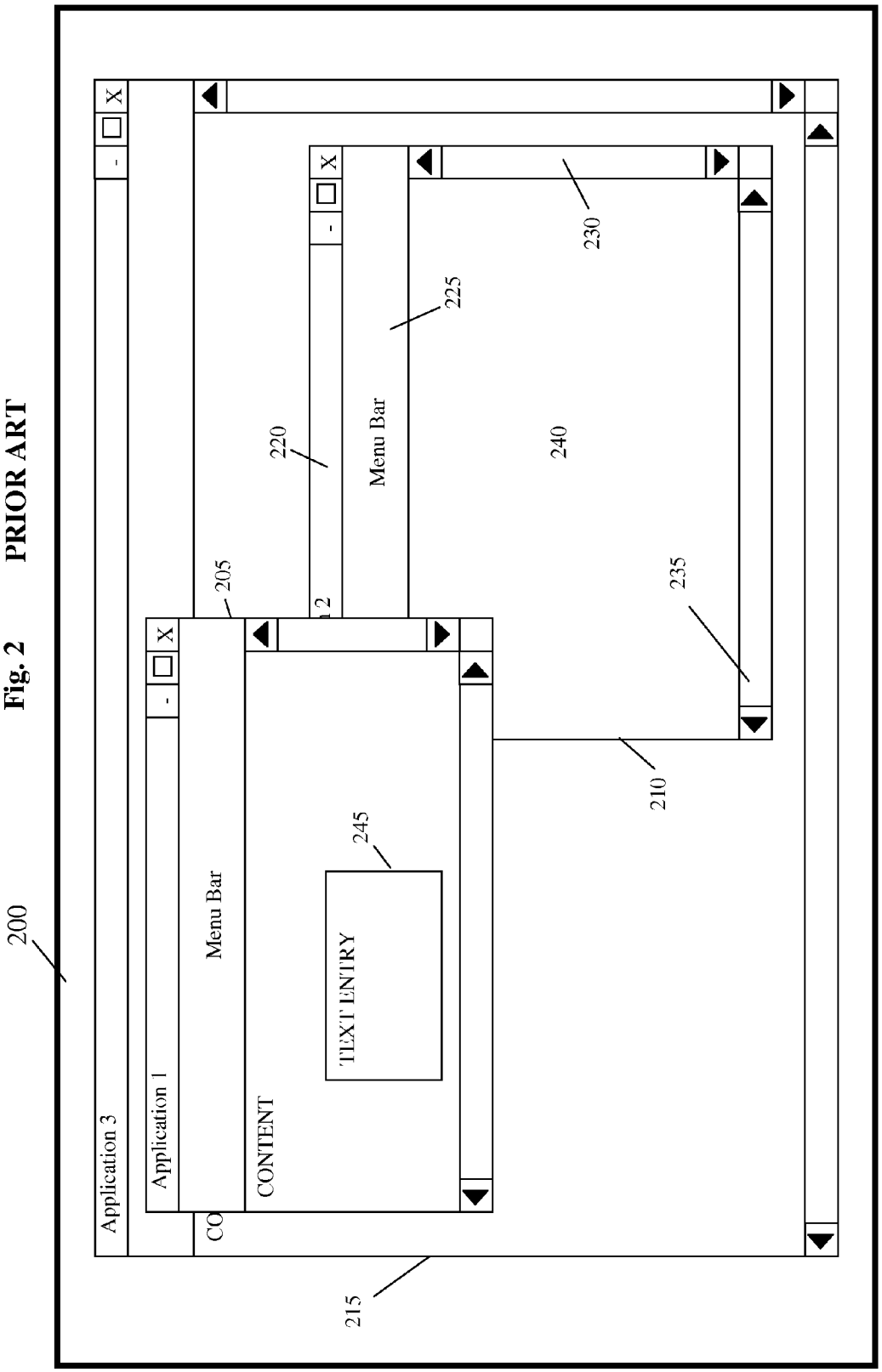
FIG. 2 shows an example of a prior art arrangement of GUI windows on a screen of an electronic device.

FIG. 2 shows an example of a prior art arrangement of a number of GUI windows on the screen 200 of display device 135. In the example of FIG. 2 three different GUI windows 205, 210 and 215 are shown, with each GUI window being associated with a different application (Application 1, 2 or 3) that is currently running on computer system 100. For the sake of simplicity and clarity in the example of FIG. 1 each GUI window 205, 210 and 215 is shown to be identical in layout, having a title bar 220, menu bar 225, vertical scroll bar 230, horizontal scroll bar 235 and content display area 240. It will be appreciated that non-identical GUI windows can also be displayed on a screen of an electronic device.

Content display area 240 may include any content that an application is to display to a user, including but not limited to text, images, animations or videos, or any combinations of these or other items. Content display area 240 may also include controls to enable the user to interact with the application with which it is associated, such as buttons, text entry fields, list or combo boxes and the like.

As shown in FIG. 2, GUI windows 205, 210 and 215 are in a stacked arrangement. GUI window 210 is in the 'foreground' and is fully visible to the user on screen 200. GUI windows 205 and 215 are in the 'background' and have some of their components obscured from the user's view. In particular, GUI window 205 obscures part of the content of GUI window 210 and 215 and GUI window 210 obscures a further part of the content of GUI window 215.

In FIG. 2, all three GUI windows are shown having only a portion of the real estate of screen 200 allocated to them; that is, none of the GUI windows shown in FIG. 2 are maximised. Each GUI window includes vertical scroll bar 230 and horizontal scroll bar 235 to allow the user to move around content display area 240 in order to display the some or all of the content contained in content display area 240 on screen 200. GUI window 205 includes text entry box 245 that allows the user to enter text using a keyboard.

It is readily apparent that the known GUI window arrangement scheme shown in FIG. 2 suffers from at least the deficiency that the user cannot see the content of each GUI window simultaneously. Further, the user must use scroll bars 230 and 235 to view and interact with content that is beyond the clipping boundary of a given GUI window.

This known arrangement also suffers from the further deficiency that it is time consuming for the user to resize and position GUI windows 205, 210 and 215. Furthermore, this known arrangement suffers from the additional deficiency that content may be resized with a changed layout of the controls within the GUI window, such that it is not easy for the user to read, view and/or interact with it.

These deficiencies are mitigated by the embodiments described herein, which will now be described with reference to FIGS. 3 to 6.

Figure 3:
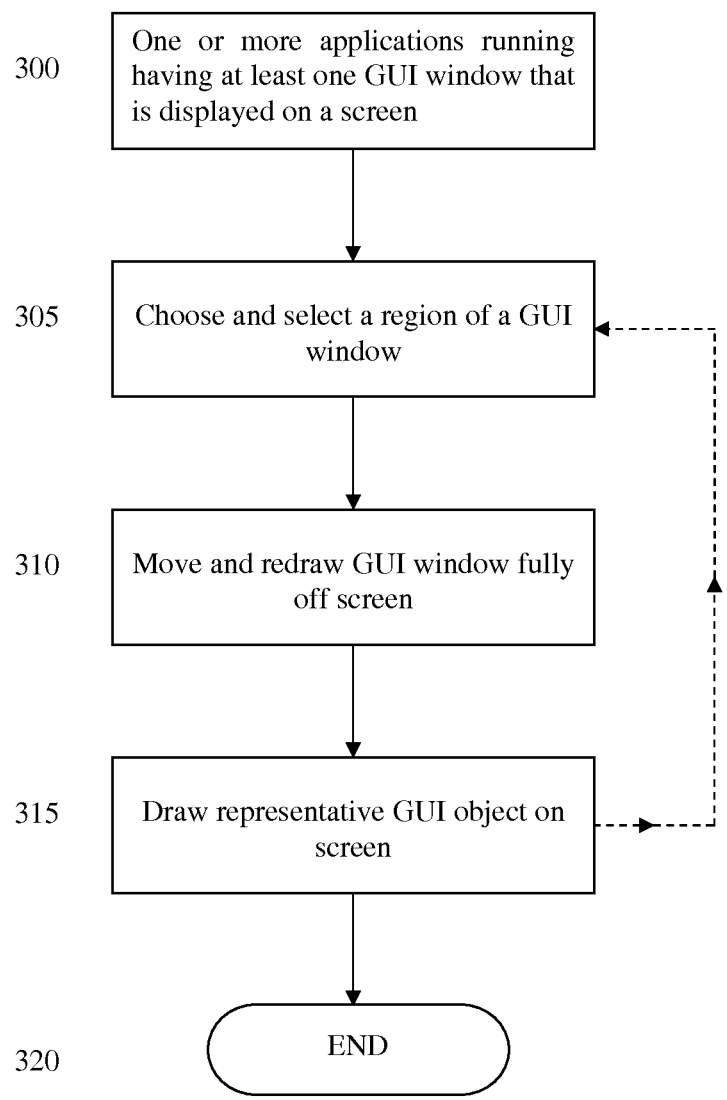
FIG. 3 shows a process by which a representative GUI object according to an exemplary embodiment is created.

FIG. 3 is a schematic flow diagram showing how a new representative GUI object according to an exemplary embodiment is created. The term 'representative GUI object' is used herein to refer to a GUI object on the screen of display device 135 that is created to represent a selected part of an original GUI object (e.g. a particular selected frame or window within an application's main window), where the original GUI object is associated with an application that is being executed by CPU 105. The way in which the representative GUI objects of the embodiments described herein are related to a GUI window is described in full in the following part of the detailed description.

To create a representative GUI object the following process is followed. Firstly, in step 300 of FIG. 3 the user or some other entity causes at least one application to execute on an electronic device, which may be computer system 100 of FIG. 1. The user may cause the at least one application to execute by any means known in the art of computing, such as controlling a cursor to click on an icon associated with the application using a mouse. The execution of the at least one application is managed by CPU 105, with the other components of computer system 100 being used by CPU 105 as required to facilitate proper execution of the at least one application.

The at least one application that is executed has associated with it at least one GUI object—typically a GUI window—that is displayed on display device 135, such as on a display screen 200, in the manner similar to GUI windows 205, 210 and 215 shown in FIG. 2.

In step 305 the user chooses and selects a region of screen 200 that they wish to create a representative GUI object of. The user is free to choose the size and position of this region, such that it may coincide with a part of or all of one of the GUI windows displayed on screen 200.

A method of selecting a region of screen 200 according to an exemplary embodiment will now be described with reference to FIGS. 4A and 4B.

Figure 4B:
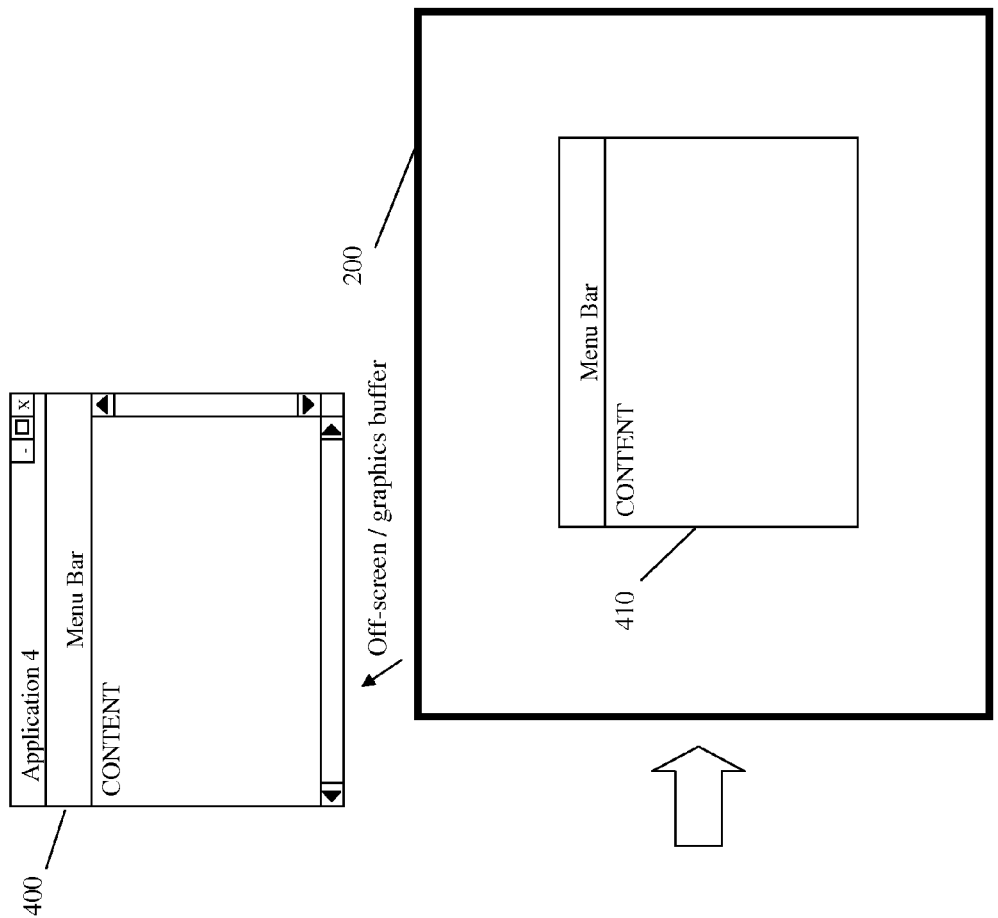
FIG. 4B shows GUI window 400 moved fully off screen 200 by instructing computer system 100 to reassign GUI window 400 to a coordinate space corresponding to an off-screen location.
Figure 4A:
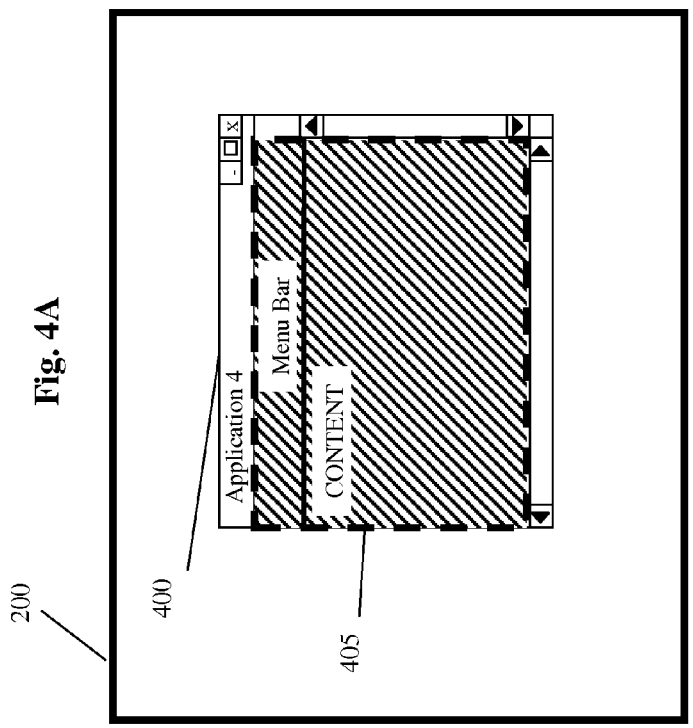
FIG. 4A shows a region of screen 200 corresponding to part of a GUI window 400.

FIG. 4A shows a region of screen 200 corresponding to part of a GUI window 400. As shown in FIG. 4A by dotted region 405, in this exemplary embodiment a region of screen 200 that corresponds to part of GUI window 400 of 'Application 4' is selected by the user. The user uses input device 110 to select the chosen region 405 of screen 200. In the present embodiment the input device is assumed to be a mouse but other input devices may be used instead, with the region selection methods described in the following being modified as required to apply to these alternative input devices.

The user may select region 405 by a 'click and drag' operation, in which a cursor is placed at a point on the screen and then a mouse button is held down whilst the cursor is moved to draw out a square or rectangular region on screen 200. A graphics object such as a semi-transparent coloured box may be drawn on screen 200 as the user performs the click and drag operation to assist the user in determining the size and shape of region 405.

Some applications may already have functionality assigned to a click and drag operation (e.g. the selection of text in a word processing application) so it may be desirable to require the user to activate the region select functionality by e.g. pressing one or more keys on a keyboard before a click and drag operation can be used to select region 405. The key or keys may need to be held down continuously to enable the region select functionality, or the key or keys may 'toggle' the region select functionality. In the former case releasing the key or keys disables the region select functionality, such that the size and shape of region 405 at the time the key or keys are released is taken as the area that the user has designated. In the latter case, one or more further key presses may be required to toggle back out of the region select functionality, with the size and shape of region 405 at the time the key or keys are pressed is taken as the area that the user has designated.

In the embodiment shown in FIG. 4A region 405 is shown as a single block. In an alternative embodiment a region can be selected that is formed of a plurality of blocks within GUI window 400, where these blocks may be contiguous or discontiguous. The user may press or hold one or more keys to enable the region select functionality, select multiple regions using a click and drag operation, and then press or release the one or more keys to disable the region select functionality. During the selection process a graphics object as described earlier may be displayed on screen 200 to indicate to the user the region(s) that they have selected. These graphics objects may remain on screen 200 until the user disables the region select functionality, at which point the region(s) that were selected are considered 'designated' by the user. The graphics objects may be interactive and may allow the user to resize, move and/or remove them.

In an alternative embodiment, the user may select a point in GUI window 400 by, for example, placing the cursor at the desired point and performing a predefined sequence of mouse button clicks and/or pressing one or more keys on a keyboard. In the latter case, a potential region of interest 405 is determined automatically. Region 405 may be indicated to the user by a graphics object of the type described earlier that is displayed on screen 200. When region 405 is determined automatically, its initial size and shape may be set to some predefined default value. In this case the user may then be able to alter at least one of the size, shape and/or position of region 405 using input device 110. The initial position of region 405 relative to the extents of screen 200 may be set based on the position of the cursor at the time the mouse button was clicked. Alternatively, the user may press and/or hold a key or series of keys on a keyboard to determine at least one of the position and/or size of region 405. Multiple contiguous or discontinuous regions of the type described earlier may be generated automatically from a single point selected by the user, or the user may select multiple points with each point automatically generating its own region.

Alternatively, the initial size, shape and position of region 405 may be determined via consideration of at least one property of the region of the GUI window in which the cursor was located at the time the user clicked the mouse button or performed some other predefined user interaction. Examples include: setting region 405 to the size and shape of a SashForm that is part of the GUI window, setting region 405 to the size and shape of a group composite that is part of the GUI window, or setting region 405 to the size and shape of a frame that is part of the GUI window. The region of interest may be indicated to the user via an on-screen graphics object in the manner described earlier. In all of these cases the user may be provided with the ability to adjust at least one of the size, shape and/or position of region 405 once it has been automatically determined.

In one embodiment introspection logic can be used to inspect the hierarchy of GUI window 400, with the result of this inspection being used to automatically determine an appropriate region. For example, in the case of a GUI window associated with a web browser, examination of HTML elements associated with a web page that is displayed by the web browser may be used to automatically determine at least one of the size, shape and/or position of a region of interest. This region of interest may be indicated to the user via an on-screen graphics object in the manner described earlier. The user may be provided with the ability to adjust at least one of the size, shape and/or position of the region once it has been automatically determined.

It is contemplated that the region of screen 200 chosen and selected by the user or determined automatically is square or rectangular, but other shaped regions such as circular or triangular or an arbitrary shape corresponding to an element of a GUI window may be chosen instead.

Returning now to FIG. 3, in step 310 the GUI window 400 is moved fully off screen 200. This may occur as soon as region 405 has been defined, or it may occur when the user disables the region select functionality. The region select functionality may be disabled through some user input such as releasing one or more keys that were depressed during the region select operation or by pressing one or more keys to toggle the region select functionality. A graphics object may be displayed on screen 200 during the region select process and the user may be required to interact with this graphics object (e.g. by clicking on it with a cursor) to end the region selection operation.

GUI window 400 is moved fully off screen 200 by instructing computer system 100 to reassign GUI window 400 to a coordinate space corresponding to an off-screen location, as shown in FIG. 4B. This location may be specified by, for example, large or negative co-ordinates in the coordinate system used to demarcate screen 200. Alternatively, an off-screen graphics buffer may be created that is large enough to accommodate GUI window 400 fully, and GUI window 400 may then be reassigned to this off-screen buffer.

In step 315 a representative GUI object 410 is drawn on screen 200 in place of GUI window 400. The size, position and shape of representative GUI object 410 corresponds to that of region 405. Representative GUI object 410 may be fixed in this position, or it may be moveable by the user via, for example, a 'click and drag' type operation as described earlier. In the case that the user selected multiple regions, a representative GUI objects is drawn on screen 200 in the place of each region.

Representative GUI object 410 may comprise an image that shows the content of GUI window 400 that fell within region 405. This image may include any of the elements present in region 405, including content, menu items, buttons, scroll bars and other user interactive elements. In the example shown in FIG. 4 representative GUI object 410 includes the content and menu bar of GUI window 400. In order to save screen real estate in the example embodiment shown in FIG. 4 representative GUI object 410 has not been drawn with additional elements that are usually associated with a GUI window, such as a menu bar, title bar, trim or border. However, this is not essential and in alternative embodiments representative GUI object 410 may be drawn with any of these elements, or any other type of similar element, if this is desirable.

The image displayed in representative GUI object 410 may be generated by capturing the graphics content of region 405 of GUI window 400. In one embodiment the size and position of region 405 may be supplied to a graphics context resource. The image may then be generated by instructing the graphics context resource to duplicate the GUI object or objects that fall within region 405. This instruction may be sent periodically to generate an updated image.

In another embodiment a graphics driver may be instructed to create a virtual device. The virtual device may then render GUI window 400 and then may generate representative GUI object 410 by instructing the graphics driver to extend the portion of GUI window 400 that is within region 405 to screen 200 for the user to view and interact with. This embodiment is particularly suited to providing a real time display and may allow, for example, for high fidelity video to be rendered in representative GUI object 410.

Further implementations known to the skilled person may also be used to generate the image displayed in representative GUI object 410.

However representative GUI object 410 is generated, the overall effect from the point of view of the user is that the region or regions of GUI window that fell outside region 405 are no longer visible; that is, GUI window 400 appears to have been cropped to the size of region 405. However, in actuality, GUI window 400 is still open and can be interacted with, except that it has been reassigned to an off-screen location or graphics buffer so that it is not visible to the user. Since the on-screen representative GUI object only corresponds to a part of the original GUI object, user interactions via a mouse or other controller of an on-screen cursor are limited to that part of the original GUI object—until the original GUI object is restored on screen. Interactions with the representative GUI object are then mapped from the on-screen coordinates of the user's interaction (e.g. a cursor location overlaying a point on the representative GUI object) to corresponding coordinates within the off-screen coordinate space of the relocated original GUI object. The application program that is associated with the original GUI object then receives inputs as if the user's interaction had been directly with the original GUI object (which is not currently displayed on screen), such that a user's interaction with the representative GUI object controls the application. This mapping between coordinate spaces is performed automatically without the associated application needing to be aware of the representative GUI object that replaced the original GUI object.

The representative GUI object comprising an image of part of an original GUI object, as described herein, differs from a so-called 'child' window (as is known in the art). A typical child window is a GUI window that is associated with a 'parent' GUI window (which may be of the type shown in FIG. 2) but typically contains at least some different content or controls compared to that of its parent GUI window, and also typically cannot be moved to a screen location that is outside the extents of its parent GUI window. Thus, a child GUI window typically overlays part of its parent GUI window, which remains visible to the user behind the child window. An example of this type of arrangement is shown in FIG. 2, in which Application 1 overlays Application 3. In contrast, the representative GUI object described herein is a representation of a portion of the content and/or controls of a GUI window, without reflowing of controls or any variations from the selected part other than possible scaling differences; and the representative GUI object automatically replaces the original GUI object on the screen, with the original GUI window being reassigned to an off-screen location or graphics buffer.

One advantage of reassigning GUI window 400 to an off-screen location or graphics buffer is that the application that GUI window 400 is associated with (i.e. Application 4 in the embodiment shown in FIGS. 3 and 4) does not need to be aware that, from the point of view of the user, it has been cropped and resized. Instead, the application behaves as if its GUI window were still at its original size. Thus, the application does not need to redraw or resize the application content and/or the controls of the GUI window. This gives the user full control over how they wish to display the content of GUI window 400. In at least this way, the embodiments described herein advantageously provide increased flexibility to the user in order to allow them to efficiently use screen real estate without sacrificing their user experience.

It will also be appreciated that the process for creating a representative GUI object described in the embodiment of FIGS. 3 and 4 requires minimal time and effort from the user. In particular, to create a representative GUI object the user need only draw or otherwise define region 405; there is no need for the user to scroll, resize, move or otherwise adjust any of the GUI windows on the screen.

Returning to FIG. 3, steps 305 to 315 may be carried out as many times as desired, such that multiple representative GUI objects may be displayed on screen 200. Once the user has as many representative GUI objects as they require, the method ends at step 320.

From time to time the user may wish to resize a representative GUI object according to any of the embodiments described herein in order to free up screen real estate. In order to facilitate this ability, each representative GUI object may be provided with a resize control. This may be shown on the representative GUI object as a control button, or it may be accessible via a menu, mouse gesture(s) or click(s), or via presses of one or more predefined keys on a keyboard, or any combination of such actions. As a further alternative the user may be able to resize a representative GUI object by selecting one of its edges via a cursor or the like and dragging this edge to dynamically resize the representative GUI object.

Whatever the means used to provide a resize control, the representative GUI object of all embodiments described herein may behave under the resize operation as an image. That is, the resize operation may cause the representative GUI object to resize itself using any image zoom formula/algorithm or the like known to the skilled person.

The contents of the representative GUI object are still on-screen and viewable by the user, but are scaled according to, for example, an image zoom formula that may be applied during or after the resize operation. Thus, the user can easily reduce the size of a representative GUI object to free up screen real estate without any of the content displayed therein being lost through, for example, clipping. The resize operation is applied only to the representative GUI object, so the off-screen application that is associated with the representative GUI object has no knowledge of this resize operation. The off-screen application will therefore not redraw the content of its GUI window, as it would normally do during or after a resize operation, avoiding the issues associated with such redrawing that were noted above.

Another advantage of using an image zoom formula to resize representative GUI object is that the representative GUI object resizes in a manner that is intuitive to a user.

Figure 5:
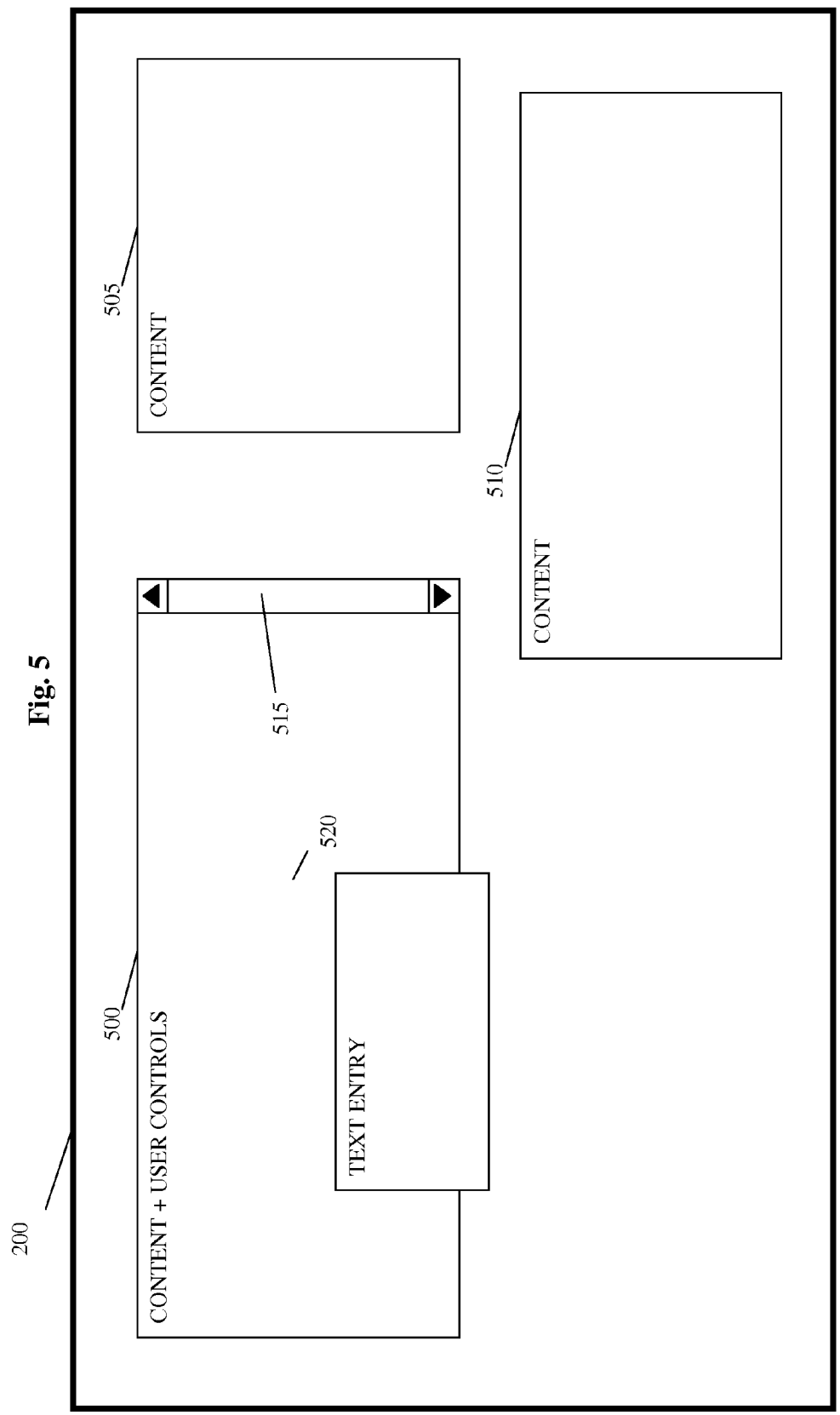
FIG. 5 shows a layout having multiple representative GUI objects created according to the process of FIG. 3.

One example of a layout having multiple representative GUI objects is shown in FIG. 5. This layout has been created by carrying out step 300 of FIG. 3 once, to create the starting window arrangement shown in FIG. 2, and then steps 305 to 315 have been carried out three times, before ending with step 320.

In the exemplary embodiment of FIG. 5 three representative GUI objects 500, 505 and 510 are shown. Representative GUI objects 510 and 515 contain only content (text, one or more images, videos etc., or any combination thereof) but representative GUI object 505 contains a user control in the form of a vertical scroll bar 515 and a text entry box 520. It will be appreciated that this is purely exemplary and any other type or number of user control(s) may be present in any of representative GUI objects 505, 510 and/or 515.

It will be appreciated that the number of representative GUI objects shown in FIG. 5 is purely exemplary and any number of representative GUI objects may be displayed simultaneously on screen 200. For simplicity in FIG. 5 no GUI windows of the type known in the art and discussed in connection with FIG. 2 are shown, but it will be appreciated that a mixture of GUI windows and representative GUI objects may be displayed on screen 200, with any number of either type of window being displayed at any one time.

From consideration of FIG. 5 it is apparent that the representative GUI objects of the embodiments described herein may be easily arranged to efficiently use screen real estate. In particular, the user is readily able to select only a portion of the GUI window of a running application that they are currently interested in, thus removing all of the extra portions of this GUI window that the user does not need to be visible. The user can make this selection completely freely, regardless of what the application associated with the GUI window may consider 'useful' to the user.

The embodiments described herein are distinguished from alternate view modes that may be provided by an application itself. Examples of such view modes are a 'full screen' mode, in which an application occupies the entire screen of a device and may remove some or all of its user controls to allow content to be viewed more readily, or a 'compact' mode in which an application provides a small GUI window that contains little or no content and a reduced set of user controls. In alternative view modes such as these, the user must be satisfied with whatever the application deems appropriate to display in the alternative view mode, which may or may not suit the user's purposes. Embodiments described herein provide a far more flexible and customisable framework within which the user may work.

As one purely illustrative example, the user may wish to create a representative GUI object that shows only the calendar or diary of an email application or the like. Such a representative GUI object allows the user to view their appointments in the calendar or diary without wasting valuable screen real estate by displaying the entire email application.

A process by which a user may interact with a user control item such as vertical scroll bar 515 or text entry box 520 in representative GUI object 505 according to an embodiment will now be described with reference to FIG. 6. It should be appreciated from the outset that the process of FIG. 6 is suited for use with any of the embodiments described herein.

In the embodiment of FIG. 6 each representative GUI object 505, 510 and 515 is individually provided with at least one input device listener. The function of the input device listener is to capture all user input that is entered in the representative GUI object and then to direct this input to the application that is associated with the representative GUI object in which the user input was captured.

Referring now directly to FIG. 6, firstly the user interacts with an application by some user input within the bounds of the on-screen representative GUI object 505 of FIG. 5. The bounds of representative GUI object 505 may be defined as the edges of representative GUI object 505, or the bounds may be defined as a region within representative GUI object 505.

In step 600, the user input is detected by an appropriate listener of representative GUI object 505 and in step 605 this input is sent to the application associated with representative GUI object 505. In some cases it may be appropriate to adjust the user input before sending it to the application, and an example of such an adjustment is provided later.

In step 610, the application responds as required to reflect the user input that has been sent to it from the listener of representative GUI object 505. In step 615 the listener of representative GUI object 505 sends a request to the off-screen application to update the GUI window that representative GUI object 505 is associated with. The listener then captures an image of this updated GUI window in step 620, crops, clips and/or resizes this image to the size of representative GUI object 505 and displays this updated image on the screen to the user. The effect is such that it appears to the user that they are interacting directly with the off-screen application itself.

A determination is made in step 625 whether the representative GUI object has been instructed to close. If it has not been instructed to close, steps 600 to 620 are repeated every time the listener detects a new user input until the representative GUI object is closed, to allow the user to interact with and control the off-screen application in real time. If the representative GUI object has been instructed to close, the method ends at step 630.

The user may close a representative GUI object according to any of the embodiments described herein with any suitable action from an input device. Examples of such actions may be pressing or holding one or more keys on a keyboard or executing a mouse gesture or click. In one embodiment the user clicks on the representative GUI object using the right mouse button to bring up an option to close it. In another embodiment representative GUI object includes an on-screen action such as a close button that the user can interact with to close it. This on-screen action may only be presented to the user when the mouse cursor is within the extents of the representative GUI object, or it may only be presented to the user when the mouse cursor is within a smaller region defined within the representative GUI object. In an embodiment particularly suited for use with a device having a touchscreen the user may execute a gesture to close the representative GUI object. Other actions suitable for closing the representative GUI object according to any of the embodiments described herein will be apparent to the skilled person having the benefit of this disclosure.

In step 630 when a representative GUI object is closed, the off-screen GUI window it is associated with is redrawn on the screen of the device at the position and size that it was when the user initially created the representative GUI object. The effect of this is to make the user believe that the representative GUI object has simply been expanded back into the full GUI window of the application.

In one embodiment each input device listener comprises a keyboard listener and mouse listener. This is purely exemplary and other listeners such as a touch gesture listener for a touchscreen may also be used. In this embodiment, the mouse listener captures, adjusts and sends the current on-screen position of a cursor to the off-screen application. The adjustment may involve adding or subtracting an offset to the on-screen coordinates of the mouse cursor before sending it to the off-screen application, so that the off-screen application is sent the 'correct' position of the cursor relative to its own off-screen location. In the case that the user clicks a mouse button, such as when the user wishes to interact with vertical scroll bar 515, the mouse listener sends this mouse click to the off-screen application in addition to the current cursor position.

The keyboard listener captures and sends keystrokes to the off-screen application as they are entered, such as keystrokes entered into text entry box 520 shown in FIG. 5.

In a further embodiment, at least one representative GUI object is also provided with one or more event listeners. An event listener works much in the same way as a input device listener, but is instead designed to capture changes to the off-screen application that are not directly as a result of user input. Many appropriate events can be conceived for an event listener to 'trigger' on, but one particular example may be where the off-screen application is playing a video. In this case the representative GUI object associated with the off-screen application may have an event listener that determines each time the off-screen application moves on to the next frame of the video, in order to capture an image of the new state of the off-screen GUI window in which the video is being played. The event listener then carries out step 620 of FIG. 6 to display the new video frame to the user.

It will be appreciated by a person skilled in the art having the benefit of this disclosure that the embodiments described herein are not restricted for use with any particular application or class of applications, or with any particular operating system or class of operating systems. Rather, embodiments may be used on any electronic device having a screen that is running any operating system with any number of applications, widgets or the like having any number of GUI windows associated therewith.

In addition to the embodiments described in detail above, the skilled person will recognize that various features described herein can be modified and combined with additional features, and the resulting additional embodiments are also within the scope of the exemplary embodiment. It will also be apparent to the skilled person that the embodiments described herein can be implemented not only by software running on an electronic device, but also by hardware logic components arranged appropriately.

As will be appreciated by one skilled in the art, aspects of the exemplary embodiment may be embodied as a system, method, computer program product or computer program. Accordingly, aspects of the exemplary embodiment may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiment may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiment may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the exemplary embodiment are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the exemplary embodiment. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of controlling the display of GUI objects on a display screen of an electronic device in response to user interactions performed by at least a first application program executing on a processor of the electronic device, the first application program having a first GUI object associated therewith displayed on the display screen, the method comprising:
   identifying, by the first application program, a selected part of the first GUI object, in response to detection of a first predefined user interaction with the first GUI object;
   creating, by the first application program, a second GUI object comprising a visual representation of the selected part of the first GUI object by,
      assigning the first GUI object to a coordinate space that is outside the display screen when displaying the second GUI object, and
      displaying the second GUI object on the display screen to automatically replace the first GUI object on the display screen; and
   detecting user interactions with the second GUI object and mapping each detected user interaction to a location within the first GUI object's assigned coordinate space outside the display screen, such that said user interactions with the second GUI object are interpreted as an interaction with the first GUI object and control the first application program.

2. The method of claim 1, wherein mapping detected user interactions comprises rescaling at least some of the detected user interactions to take account of differences of scale between the first GUI object and the second GUI object.

3. The method of claim 1, further comprising:
   modifying the displayed second GUI object to reflect changes to the first GUI object.

4. The method of claim 1, wherein the second GUI object comprises an image of the selected part of the first GUI object.

5. The method of claim 1, further comprising the steps of:
   detecting user input that corresponds to a user instruction to resize the second GUI object; and
   resizing the second GUI object using an image resizing algorithm.

6. An executable software product stored on a non-transitory computer-readable storage medium containing program instructions for controlling the display of GUI objects on a display screen of an electronic device in response to user interactions performed by at least a first application program executing on a processor of the electronic device, the first application program having a first GUI object associated therewith displayed on the display screen, the program instructions for:
   Identifying, by the first application program, a selected part of the first GUI object, in response to detection of a first predefined user interaction with the first GUI object;
   creating, by the first application program, a second GUI object comprising a visual representation of the selected part of the first GUI object by,
      assigning the first GUI object to a coordinate space that is outside the display screen when displaying the second GUI object, and
      displaying the second GUI object on the display screen automatically replace the first GUI object on the display screen; and
   detecting user interactions with the second GUI object and mapping each detected user interaction to a location within the first GUI object's assigned coordinate space outside the display screen, such that said user interactions with the second GUI object are interpreted as an interaction with the first GUI object and control the first application program.

7. The executable software product of claim 6, wherein mapping detected user interactions comprises rescaling at least some of the detected user interactions to take account of differences of scale between the first GUI object and the second GUI object.

8. The executable software product of claim 6, further comprising program instructions for:
   modifying the displayed second GUI object to reflect changes to the first GUI object.

9. The executable software product of claim 6, wherein the second GUI object comprises an image of the selected part of the first GUI object.

10. The executable software product of claim 6, further comprising program instructions for:
    detecting user input that corresponds to a user instruction to resize the second GUI object; and
    resizing the second GUI object using an image resizing algorithm.

11. A system, comprising:
   a memory;
   a display screen;
   a processor coupled to the memory and to the display screen, the processor executing one or more application programs including a first application program having a first GUI object on the display screen associated therewith;

wherein the first application program is configured to:

identify a selected part of the first GUI object, in response to detection of a first predefined user interaction with the first GUI object;

create a second GUI object comprising a visual representation of the selected part of the first GUI object by, assign the first GUI object to a coordinate space that is outside the display screen when displaying the second GUI object, and display the second GUI object on the display screen to automatically replace the first GUI object on the display screen; and detect user interactions with the second GUI object and map each detected user interaction to a location within the first GUI object's assigned coordinate space outside the display screen, such that said user interactions with the second GUI object are interpreted as an interaction with the first GUI object and control the first application program.

12. The system of claim 11, wherein mapping detected user interactions comprises rescaling at least some of the detected user interactions to take account of differences of scale between the first GUI object and the second GUI object.

13. The system of claim 11, wherein the displayed second GUI object is modified to reflect changes to the first GUI object.

14. The system of claim 11, wherein the second GUI object comprises an image of the selected part of the first GUI object.

* * * * *